United States Patent [19]

Angly

[11] Patent Number: 4,787,535

[45] Date of Patent: Nov. 29, 1988

[54] APPARATUS FOR THE DOSED DELIVERY OF A GRANULAR SOLID MATERIAL

[75] Inventor: Henri Angly, Hegenheim, France

[73] Assignees: Contraves AG, Zürich; Sandoz AG, Basel, both of Switzerland

[21] Appl. No.: 856,652

[22] Filed: Apr. 28, 1986

[30] Foreign Application Priority Data

May 20, 1985 [CH] Switzerland .......................... 2141/85

[51] Int. Cl.$^4$ .............................................. B67D 5/40
[52] U.S. Cl. .................................... 222/148; 222/326; 222/370
[58] Field of Search .......................... 222/148, 180–182, 222/185, 216, 218, 636–637, 252, 302, 326, 344, 367–368, 370, 386, 390, 217, 256; 141/183, 249, 27

[56] References Cited

U.S. PATENT DOCUMENTS

| | | | |
|---|---|---|---|
| 1,969,385 | 8/1934 | Raemer | 221/116 |
| 2,151,511 | 3/1939 | Hagen | 222/252 X |
| 3,554,406 | 1/1971 | Kleysteuber | 222/370 X |
| 3,995,777 | 12/1976 | Diez et al. | 222/370 |
| 4,092,046 | 5/1978 | Bombelli et al. | 302/49 |
| 4,171,756 | 10/1979 | Jones-Fenleigh | 222/217 |
| 4,417,802 | 11/1983 | Forbes II | 222/252 X |

FOREIGN PATENT DOCUMENTS 2134487 8/1984 United Kingdom .

OTHER PUBLICATIONS

Verpackungs-Rundschau, Jun. 1984, pp. 910–922.

Primary Examiner—Michael S. Huppert
Attorney, Agent, or Firm—Werner W. Kleeman

[57] ABSTRACT

The apparatus for the dosed delivery of a granular solid material to a reaction container possessing a delivery inlet possesses a dosing device comprising a piston-cylinder unit which opens or discharges into the base or floor of a transfer chamber. The solid material which exits or leaves the dosing device is conveyed in the transfer chamber by means of a rotating conveyor component to a funnel whose inlet opening is located in the base or floor of the transfer chamber. The conveyor elements or cavities of the conveyor component extend over the entire cross section of the inner volume of the transfer chamber such that the solid material is transferred without loss from the dosing device to the funnel which discharges into the delivery inlet of the reaction container and the conveyor component seals the gas volume above the funnel.

15 Claims, 2 Drawing Sheets

APPARATUS FOR THE DOSED DELIVERY OF A GRANULAR SOLID MATERIAL

BACKGROUND OF THE INVENTION

The present invention broadly relates to an apparatus for the dosed delivery of a granular solid material to a reaction container possessing a delivery inlet. The apparatus is provided with a delivery funnel for connection to the delivery inlet of the reaction container.

For the automatic operation of reaction processes in a reaction container, it is desirable to be able to dose or deliver the reaction components according to a predetermined time program with a high degree of accuracy or precision so that the reaction process is capable of being repeated with a high degree of accuracy and that a uniform product quality is achievable. This is also especially applicable for reaction processes which are conducted in test laboratories in order to be able to conduct test series until an optimum is achieved.

Furthermore, no gas should be able to flow into or leak out of the reaction container in an uncontrolled manner, i.e. during the interruption of delivery or dosage, a connection or communication to the outside or to a magazine or storage chamber for the reaction component to be dosed or delivered must be avoided or prevented connection or communication would lead to an uncontrolled change of this reaction components.

The delivery or dosage of liquid reaction components by means of conventional dosing pumps does not pose technical difficulties to meeting the aforesaid requirements. The known apparatus for the dosage of granular solid materials, however, do not fulfill these requirements or only partially fulfill them. A review of known apparatus as for the dosage of lumpy or chunk-like pieces of filling material, granular and pulverulent filling material is given, for example, in the magazine "Verpackungs-Rundschau", 6/1984, pages 910-922.

SUMMARY OF THE INVENTION

Therefore, with the foregoing in mind, it is a primary object of the present invention to provide a new and improved construction of an apparatus for the dosed delivery of a granular solid material to a reaction container possessing a delivery inlet and which apparatus does not exhibit the aforesaid drawbacks and shortcomings of the prior art constructions.

Another and more specific object of the present invention aims at providing a new and improved construction of an apparatus for the dosed delivery of a granular solid material to a reaction container possessing a delivery inlet and which apparatus, based upon a simple design, fully fulfills the previously mentioned requirements.

Yet a further significant object of the present invention aims at providing a new and improved construction of an apparatus for the dosed delivery of a granular solid material of the character described and which apparatus is relatively simple in construction, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the inventive apparatus for the dosed delivery of a granular solid material to a reaction container possessing a delivery inlet is manifested by the features that a transfer chamber connects an inlet opening of a delivery funnel with an outlet opening of a dosing device and these openings are provided in the floor or base of the transfer chamber. A rotating or rotary conveyor component is contained within the transfer chamber for the conveyance of the granular solid material from the dosing device to the delivery funnel.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
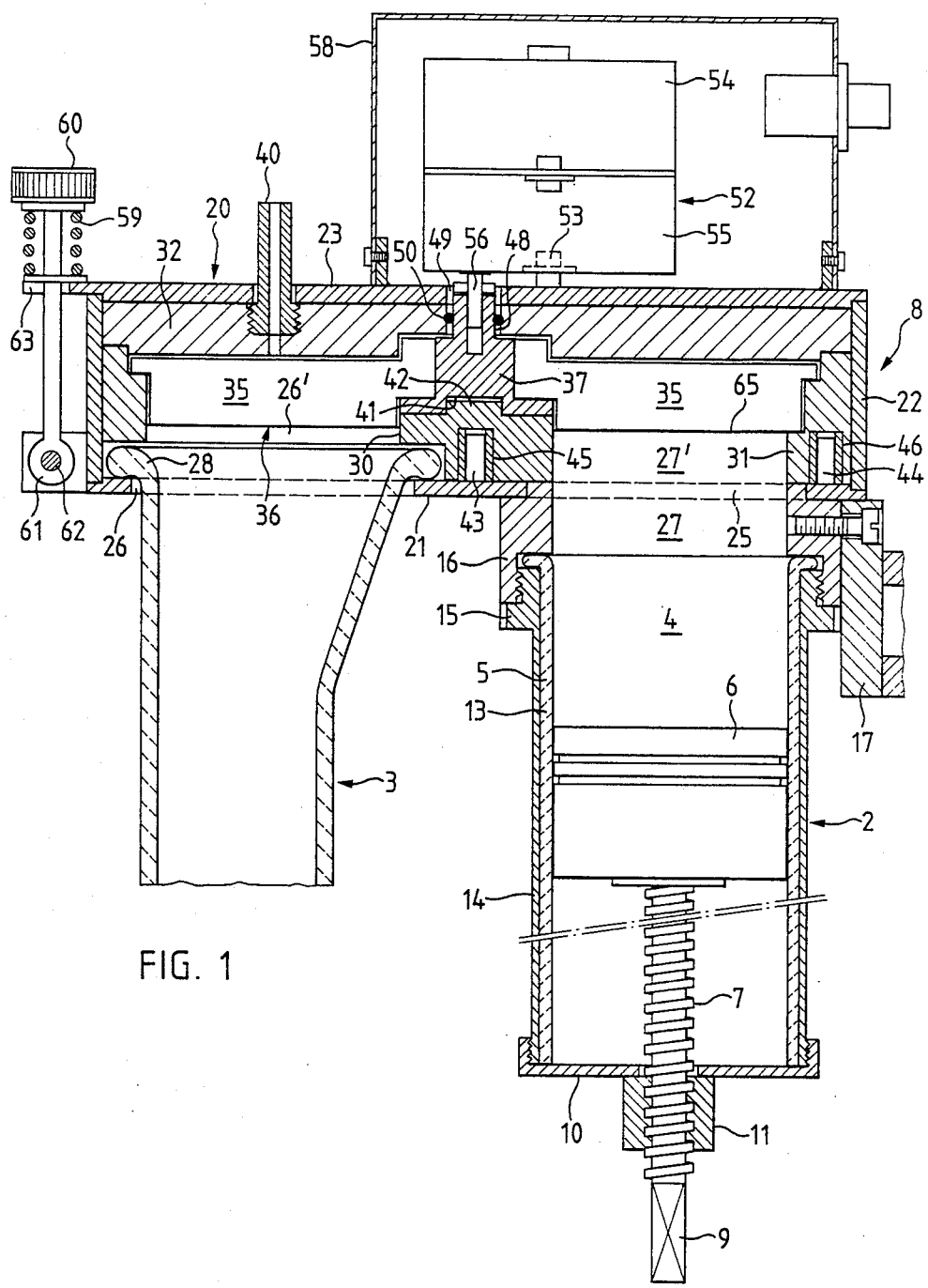
FIG. 1 is a simplified illustration of a cross section of a preferred embodiment of the apparatus according to the invention.

Describing now the drawings, it is to be understood that to simplify the showing thereof only enough of the structure of the apparatus for the dosed delivery of a granular solid material to a reaction container possessing a delivery inlet has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise a piston-cylinder unit 2 having a substantially vertically oriented axis and used for the regulated supply or infeed of a granular solid material to a not particularly illustrated laboratory reactor located beneath a delivery or dosing funnel 3. The reactor, which for example may be made of glass, possesses several delivery inlets on its upper portion or side, of which one delivery inlet is hermetically sealed with the delivery funnel 3 of the apparatus according to the invention by means of a conventional ground-glass joint. The delivery of the granular solid material to the reaction chamber of the reactor occurs from above under the action of the force of gravity. However, the piston-cylinder unit 2 acts in a direction from below to above, since a storage chamber or magazine 4 for the solid material to be introduced into the reactor is located in a dosing cylinder 5 above a dosing piston 6.

The dosing piston 6 is slowly moved upward by means of a threaded spindle 7 in the dosing cylinder 5, only part of the length of which is illustrated in FIG. 1, in order to transfer or deliver the solid material to a transfer chamber 8 under the control of any suitable time program. For this purpose a not particularly shown but conventional drive means which is connected with a square or four-cornered journal or drive member 9 is controlled by means of a computer serving to control the reaction by means of the drive speed and/or time phases of the drive means. The dosing piston 6 is prevented from turning by frictional forces so that only the threaded spindle 7 rotates or turns in a threaded bushing 11 provided on a base or floor plate 10 of the dosing cylinder 5 and displaces the dosing piston 6 by means of, for instance, a not particularly shown thrust bearing which is located on the upper end of the threaded spindle 7 within the dosing piston 6.

The dosing piston 6 is made, for example, from a suitable synthetic material or plastic and the dosing cylinder 5 is made from glass or a transparent synthetic material or plastic in order to provide sufficient sealing of the dosing piston 6 in the dosing cylinder 5 and in order to provide resistivity against chemically aggressive solid materials. The cylinder and piston of a commercially available dosing or injection syringe made for liquids can be utilized for constructing the piston-cylinder unit 2 by placing a glass cylinder 13 in a holder or supporting member 14. The threaded-on base or floor plate 10 of the holder or supporting member 14 is provided with the threaded bushing 11 and whose upper end 15 is threaded onto a socket or base portion 16 provided beneath or under the transfer chamber 8.

A mounting support 17 is laterally provided on the socket or base portion 16 in which a not particularly illustrated rod of a conventional mounting support arrangement for a laboratory stand can engage in order to place the apparatus in the desired position relative to the laboratory reactor.

The central portion of the apparatus according to the invention is formed by the transfer chamber 8. This transfer chamber 8 possesses an outer casing or shell 20 made from stainless steel with a substantially flat, substantially circular base plate 21, a substantially circular cylindrical side wall 22 and a substantially flat cover plate 23. Two diametrically opposed openings 25 and 26 are located in the base plate 21. The opening or outlet opening 25 of the base plate 21 accomodates the socket or base portion 16 which, with a correspondingly large or approximately as large an opening 27 in such socket or base portion 16 forms the passage or bridge to the dosing cylinder 5. The delivery funnel 3 is placed in the other opening or inlet opening 26 of the base plate 21 and is held or fastened to this base plate 21 with its flange 28 which engages or grips the edge of the opening 26 inside the transfer chamber 8.

The outer casing or shell 20 encloses several inner lining components, i.e. a base side plate 30, openings 26' and 27' which cover or overlap the openings 26 and 27, respectively, a side wall ring 31 and a cover side plate 32 which are all made from synthetic material or plastic and for their dimensional stability are formed with relatively thick walls. These inner lining components serve to provide a close sealing contact with winged or winglike conveyor elements or vanes 35 of a rotary conveyor component 36 which is enclosed in the transfer chamber 8. The inner lining components are loosely or removably set in the outer casing or shell or housing 20 to allow cleaning to be easily done.

The rotary conveyor component 36 possesses four of the aforementioned conveyor elements or vanes 35 which are radially positioned with the same angle to one another from a central shaft member 37. The conveyor elements 35 occupy the full interior cross section of the transfer chamber 8 with their vertically oriented rectangular cross section together with the shaft member 37 with a small or minor sealing space so that a sluice-like or sliding seal is provided in the transfer chamber 8. This transfer chamber 8 is located between the delivery funnel 3 which is in direct contact with the inner space of the reaction container and the storage chamber or magazine 4 provided above the dosing piston 6. A connector 40 provided on the cover side plate 32 protrudes through the outer cover plate 23 to the outside and allows flushing or rinsing of the transfer chamber 8 with an inert gas.

The shaft member 37 surroundingly engages a short centering journal 42 formed on the base side plate 30 with a central groove 41. This base side plate 30 is set upon two pins or journals 43 and 44 provided in the base plate 21 by means of respective sleeves or bushings 45 and 46 in order to assure that the base side plate 30 can rotate. The shaft member 37 projects upwardly through respective bores 48 and 49 into the cover side plate 32 and the cover plate 23 and is sealed by means of a sealing ring 50, such as an O-ring with respect to the bore 48. A drive means 52 for the conveyor component 36 is fastened to a pin or journal 53 on the cover plate 23. This drive means 52 comprises an electric motor 54 and a reduction gearing or transmission 55 whose flattened shaft end 56 engages a slot 57 (cf. FIG. 2) at the upper end of the shaft member 37 such that the coupling between the drive means 52 and the rotary conveyor component 36 is readily loosened or separated when lifting up the cover plate 23, thus permitting the drive means 52 to be easily detached. The drive means 52 is enclosed for its protection by a housing 58 which is mounted with screws (shown but not particularly referenced) to the cover plate 23.

An easy opening of the transfer chamber 8 is required for cleaning the conveyor component 36 as well as the inner surfaces of the transfer chamber 8. It is also possible to fill the storage chamber or magazine 4 by opening the transfer chamber 8 rather than by unscrewing the dosing cylinder 5 from the socket or base portion 16. In order to open the transfer chamber 8, three screw nuts 60 are loosened by hand so that clamping or locking bolts 61 pivot or swing outward on their latching pins 62 which are fastened to the side wall 22 in order to release a locking or supporting fork 63 of the cover plate 23. A helical or coil spring 59, which is enclosed between the screw nuts 60 and the cover plate 23, causes a resilient pressure or force of the cover plate 23 against the cover side plate 32 which covers the conveyor component 36 and its conveyor elements 35, respectively.

Figure 2:
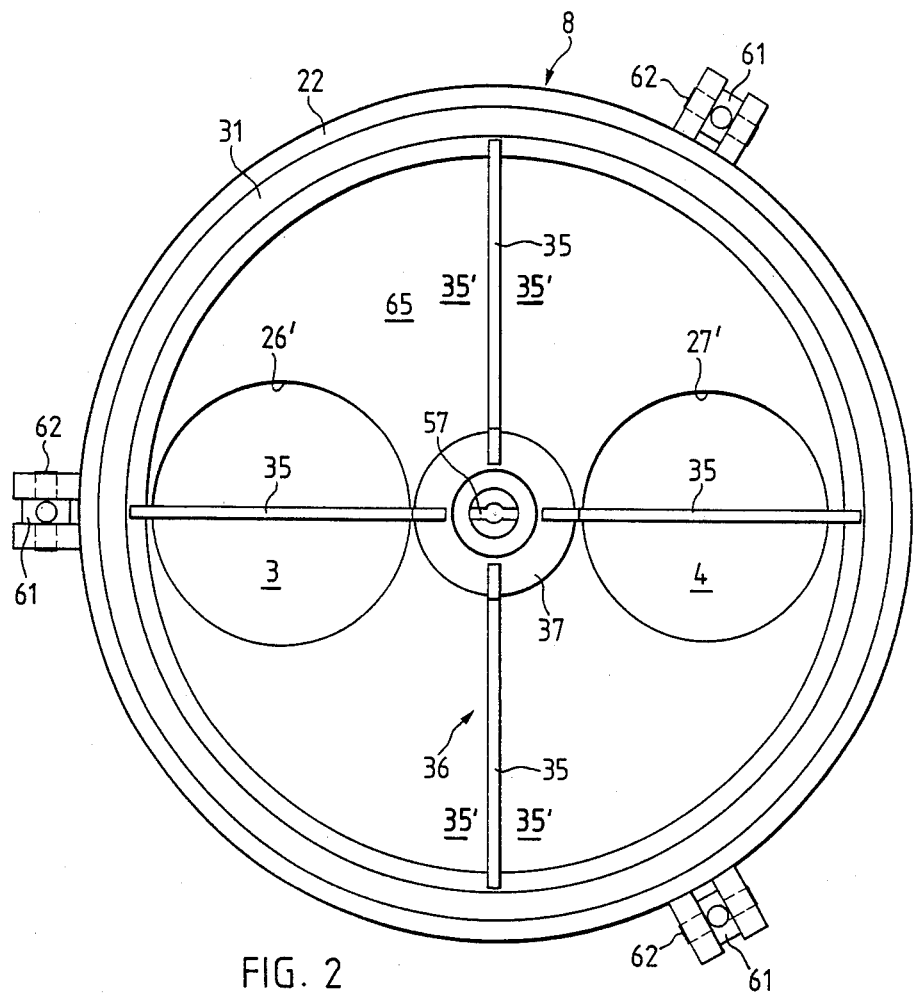
FIG. 2 is a top plan view of the apparatus with the cover plate of the transfer chamber removed to reveal internal structure.

FIG. 2 illustrates that the gas volume above the storage chamber or magazine 4 is closed in any rotational position of the conveyor component 36 with respect to the gas volume above the delivery funnel 3 by the four conveyor elements 35. The rotation of the conveyor component 36 causes a quantity of the granular solid material conveyed upward by the controlled upward movement of the dosing piston 6 to be conveyed above the plane of a base surface 65 of the base side plate 30 by means of the conveyor elements 35 in the direction of rotation across the base surface 65 to the delivery funnel 3 such that the conveyed granular solid material falls through the delivery funnel 3 into the delivery inlet of the reaction container. The smooth surfaces of the inner lining components 30, 31 and 32 which are made of a synthetic material or plastic and along with the conveyor elements 35, which are made from a synthetic material or plastic with good anti-friction properties, move in close contact, prevent a transfer loss resulting from adherent or clinging particles of the granular solid material. The conveyor elements 35 can obviously have different shapes and can be provided in various numbers or quantities. The conveyor elements 35 define dosing or transfer compartments 35' for receiving and transfering measured charges of the granulate material to be dosed. The frequency and spacing of the conveyor elements 35 as well as their inherent thinness guarantees a rapid succession of delivery of successive charges. The conveyor elements 35 are also arranged to prevent gas communication between the delivery funnel 3 and the dosing chamber 4.

The substantially vertical arrangement of the dosing cylinder 5 has the advantage that the pebble-like or granular solid material is enclosed in the storage chamber or magazine 4 under the exactly defined action of the force of gravity such that it can be very uniformly dosed and in which the exactness of the dosage is not adversely effected by free-fall effects of the granular solid material. Due to the positive dosing action of the dosing piston 6 opposite to the direction of gravity the granular material to be dosed is introduced into the transfer chamber 8 in a manner which precludes the inadvertent formation of voids or material bridges which would preclude the attainment of uniformly accurate dosed quantities of the granular material.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for the dosed delivery of a granular solid material to a reaction container possessing a delivery inlet, comprising:
   a delivery funnel adapted to be connected to the delivery inlet of the reaction container;
   said delivery funnel having an inlet opening;
   a dosing device having a supply of granular solid material and an outlet opening;
   a transfer chamber connecting said inlet opening of said delivery funnel with said outlet opening of said dosing device;
   said dosing device conveying the granular solid material upwardly against the force of gravity through said outlet opening into said transfer chamber;
   said transfer chamber having a base means;
   said outlet opening of said dosing device and said inlet opening of said delivery funnel being located in said base means of said transfer chamber; and
   conveying means within said transfer chamber and including a predetermined number of vanes for conveying said granular solid material from said outlet opening of said dosing device to said inlet opening of said delivery funnel.

2. The apparatus as defined in claim 1, wherein:
   said conveying means comprise a predetermined number of conveyor elements located within said transfer chamber;
   said predetermined number of conveyor elements sealing in any position a portion of said transfer chamber comprising said outlet opening of said dosing device with respect to a portion of said transfer chamber comprising said inlet opening of said delivery funnel;
   said transfer chamber having an inner volume; and
   said predetermined number of conveyor elements extending over essentially the entire cross section of said inner volume of said transfer chamber.

3. The apparatus as defined in claim 2, further including:
   a connector provided for said transfer chamber for the introduction of a gas into said inner volume of said transfer chamber.

4. The apparatus as defined in claim 1, wherein:
   said dosing device comprises a substantially vertically oriented piston-cylinder unit;
   said dosing device containing a storage chamber for the granular solid material;
   said piston-cylinder unit comprising a piston; and
   said storage chamber of said dosing device being located above said piston of said piston-cylinder unit.

5. The apparatus as defined in claim 1, wherein:
   said base means of said transfer chamber is substantially flat and oriented substantially horizontally;
   said transfer chamber comprising a substantially flat cover arranged substantially parallel to said base means; and
   said transfer chamber further including a substantially circular ring-shaped side wall.

6. The apparatus as defined in claim 5, wherein:
   said base means, said substantially flat cover and said substantially circular ring-shaped side wall define an outer housing of said transfer chamber;
   said substantially flat cover being detachable;
   each of said base means, said substantially flat cover and said substantially circular ring-shaped side wall being provided with respective inner lining components; and
   said outer housing of said transfer chamber enclosing said inner lining components.

7. The apparatus as defined in claim 6, wherein:
   said inner lining components are removably inserted in said outer housing of said transfer chamber.

8. The apparatus as defined in claim 6, wherein:
   said inner lining components are constructed of glass.

9. The apparatus as defined in claim 6, wherein:
   said inner lining components are constructed of a synthetic material.

10. The apparatus as defined in claim 1, wherein:
    said dosing device includes a dosing cylinder; and
    said delivery funnel and said dosing cylinder are constructed of glass.

11. The apparatus as defined in claim 1, wherein:
    said dosing device comprises means for introducing said granular solid material into said transfer chamber against the force of gravity; and
    said conveying means comprising a predetermined number of conveyor elements arranged to permit a rapid succession of dosing charges composed of said granular solid material to be received from said dosing device and conveyed to said delivery funnel.

12. The apparatus as defined in claim 1, wherein:
    said conveying means further comprise drive means for displacing said vanes in said transfer chamber and thereby displacing a respective dosed quantity of said granular solid material from said outlet opening of said dosing device to said inlet opening of said delivery funnel.

13. The apparatus as defined in claim 1, wherein:
    said base means comprises a base plate; and
    said base plate being provided with both said outlet opening of said dosing device and said inlet opening of said delivery funnel.

14. An apparatus for the dosed delivery of a granular solid material to a reaction container possessing a delivery inlet, comprising:

a delivery funnel adapted to be connected to the delivery inlet of the reaction container;

said delivery funnel having an inlet opening;

a dosing device having a supply of granular solid material and an outlet opening;

a transfer chamber connecting said inlet opening of said delivery funnel with said outlet opening of said dosing device;

said dosing device conveying the granular solid material in a compacted state upwardly against the force of gravity through said outlet opening into said transfer chamber;

said transfer chamber having a stationary base means;

said outlet opening of said dosing device and said inlet opening of said delivery funnel being located in said stationary base means of said transfer chamber;

conveying means within said transfer chamber for conveying said granular solid material from said outlet opening of said dosing device to said inlet opening of said delivery funnel;

said conveying means comprises a predetermined number of vanes; and said conveying means further comprising drive means for displacing said vanes in said transfer chamber and thereby scrapingly and controllably displacing a respective dosed quantity of said granular solid material from said outlet opening of said dosing device to said inlet opening of said delivery funnel.

15. The apparatus as defined in claim 14, wherein:

said transfer chamber has a first space above said outlet opening of said dosing device and a second space above the inlet opening of the delivery funnel; and said vanes closing off the first space and the second space from one another in every displaced position of said vanes.

* * * * *

UNITED STATES PATENT AND TRADEMARK OFFICE
CERTIFICATE OF CORRECTION

PATENT NO. : 4,787,535
DATED : November 29, 1988
INVENTOR(S) : HENRI ANGLY

It is certified that error appears in the above-identified patent and that said Letters Patent is hereby corrected as shown below:

Column 1, line 27, after "vented" please insert --which--

Column 3, line 34, please delete "accomodates" and insert --accommodates--

Column 4, line 60, please delete "with" and insert --which--

Signed and Sealed this

Twenty-ninth Day of August, 1989

Attest:

DONALD J. QUIGG

Attesting Officer

Commissioner of Patents and Trademarks